US006757414B1

(12) United States Patent
Turek et al.

(10) Patent No.: US 6,757,414 B1
(45) Date of Patent: Jun. 29, 2004

(54) METHOD AND APPARATUS FOR SEGMENTATION OF A LEFT VENTRICULAR EPICARDIUM

(75) Inventors: Matthew W. Turek, Glenville, NY (US); Gopal B. Avinash, New Berlin, WI (US); William J. Bridge, Watertown, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 548 days.

(21) Appl. No.: 09/652,739

(22) Filed: Aug. 31, 2000

(51) Int. Cl.[7] .............................................. G06K 9/00
(52) U.S. Cl. ...................................................... 382/128
(58) Field of Search ................................ 382/128, 130, 382/131, 199

(56) References Cited

U.S. PATENT DOCUMENTS

| 5,065,435 A | * | 11/1991 | Oe ............................... 382/107 |
| 5,239,591 A | * | 8/1993 | Ranganath .................... 382/128 |
| 5,734,739 A | * | 3/1998 | Sheehan et al. ............. 382/128 |
| 5,898,797 A | * | 4/1999 | Weiss et al. ................. 382/199 |

OTHER PUBLICATIONS

Buller, V.G.M., van der Geest, R.J., Kool, M.D. van der Wall, E.E., de Roos, A. & Reiber, J.H.C. (1997, Sep.) Assessment of Regional Left Ventricular Wall Parameters from Short Axis Magnetic Resonance Imaging using a Three Dimensional Extension to the Improved Centerline Method, *Investigative Radiology*, 32(9) 529–539.
Caselles, V., Catte, F., Cool, T. & Dibos, F. (1993) A Geometric Model for Active Contours in Image Processing. *Numerische Mathematik.*, 66, 1–31.

Chen, J.T.T. (1997) *Essentials of Cardiac Imaging.* (Second Edition). Philadelphia, PA: Lippencott—Raven Publishers, pp. 47–68.
Kimia, B.B., Tannenbaum, A., & Zucker, S.W. (Jan. 15, 1992) On the Evolution of Curves via a Function of Curvature I. The Classical Case. *Mathematical Analysis and Applications 163(2),* 438–458.
Malladi, R. Sethian, J., & Vemuri, B. (1995) Shape Modeling with Front Propagation: A Level Set Approach. *IEEE Transactions on Pattern Analysis and Machine Intelligence.* 17, 158–175.
McVeigh, E.R. & Guttman, M.A., (1992) Visualization and Analysis of Fuctional Cardiac MRI Data, *Proceedings of The International Society for Optical Engineering.* 2168.
O'Dell, W.G., Moore, C.C. Hunter, W.C., Zerhouni, E.A., McVeigh, E.R., (1994) Displacement Field fitting for Calculating 3D Myocardial Deformations from Tagged MR Images. [WWW document] URL http://prospero.bme–mr-i.jhu.edu/papers/wodell94 I/fieldfit rad.html.
Osher, S.J., Sethian, J.A. (1988) Fronts Propagation with Curvature Dependent Speed: Algorithms Based on Hamilton–Jacobi Formulations. *Journal of Computational Physics.* 79 12–49.

(List continued on next page.)

*Primary Examiner*—Leo Boudreau
*Assistant Examiner*—Tom Y. Lu
(74) *Attorney, Agent, or Firm*—Quarles & Brady LLP

(57) ABSTRACT

A method and apparatus is provided for segmenting a left ventricular epicardium in a magnetic resonance image. Image shape, gradients, and intensity are used to locate the epicardial boundary. Specifically, an intensity map corresponding to acquired data is produced and refined so as to produce a classification map having variations in intensity. The variations, representing the epicardial boundary, are detected and the epicardial boundary may then be clearly identified in the MR image.

21 Claims, 10 Drawing Sheets

OTHER PUBLICATIONS

Sapiro, G. & Tannenbaum, A. (1993) On Invariant Curve Evolution and Image Analysis, *Indiana University Mathematics Journal*; 42(3), 985–1009.

Sethian, J.A. (1997, May–Jun.) Tracking Interfaces with Level Sets. *American Scientist.*, 85, 254–263.

Van der Geest, R.J., de Roos, A., van der Wall, Ernst E., & Reiber, J.H.C. (1997) Quantitative Analysis of Cardiovascular MR Images., *International Journal of Cardiac Imaging*; 13 247–258.

*Comparison Between Manual and Semiautomated Analysis of Left Ventricular Volume Parameters form Short–Axis MR Images*, Rob J. van der Geest, et al., Journal of Computer Assisted Tomography, 21(5):756–765, 1997.

*Contour Extraction from Cardiac MRI Studies Uisng Snakes*, Surendra Ranganath, IEEE Transactions on Medical Imaging, vol. 14, No. 2, Jun. 1995.

*A Geometric Snake Model for Segmentation of Medical Imagery*, Anthony Yezzi, Jr. et al., IEEE Transactions on Medical Imaging, vol. 16, No. 2, Apr. 1997.

*Segmentation of Cardiac Cine MR Images for Extraction of Right and Left Ventricular Chambers*, Ardeshir Goshtasby et al., IEEE Transactions on Medical Imaging, vol. 14, No. 1, Mar. 1995.

*A semi–automated computerized system for fracture assessment of spinal x–ray films*, Jill C. Gardner, et al., pp. 996–1008/SPIE–The International Society for Optical Engineering, vol. 2710.

* cited by examiner

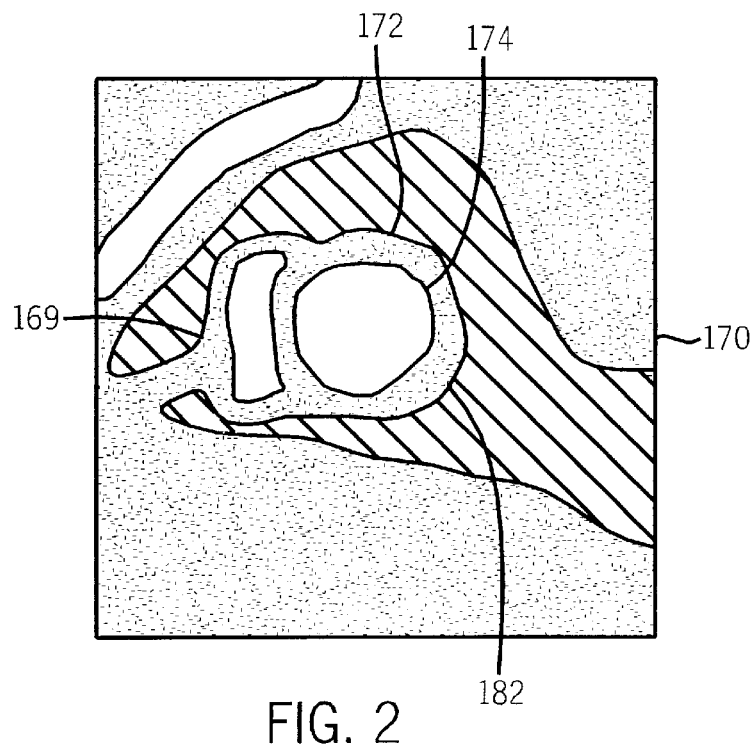
FIG. 2
| 238 | 240 | 236 |
|---|---|---|
| 1 | 1 | 1 |
| 1 | 0 | 1 |
| 1 | 1 | 1 |
FIG. 5
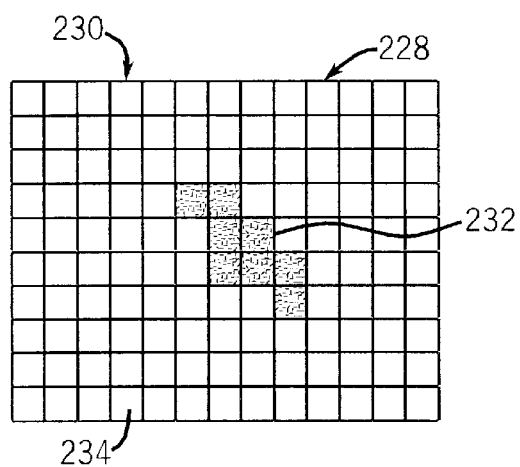
FIG. 6

METHOD AND APPARATUS FOR SEGMENTATION OF A LEFT VENTRICULAR EPICARDIUM

BACKGROUND OF THE INVENTION

The present invention relates generally to nuclear magnetic resonance imaging methods and systems, and in particular, relates to segmentation of a human internal organ, or a portion of an internal organ, for example a left ventricular epicardium.

When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated, this signal may be received and processed to form an image.

When utilizing these signals to produce images, magnetic field gradients ($G_x$ $G_y$ and $G_z$) are employed. Typically, the region to be imaged is scanned by a sequence of measurement cycles in which these gradients vary according to the particular localization method being used. The resulting set of received NMR signals are digitized and processed to reconstruct the image using one of many well-known reconstruction techniques.

Most NMR scans currently used to produce medical images require many minutes to acquire the necessary data. The reduction of this scan time is an important consideration since reduced scan time increases patient throughput, improves patient comfort, and improves image quality by reducing motion artifacts. There is a class of pulse sequences which have a very short repetition time (TR) and result in complete scans which can be conducted in seconds rather than minutes. When applied to cardiac imaging, for example, a complete scan from which a series of images showing the heart at different phases of its cycle can be acquired in a single breath-hold.

The prognosis of patients with a wide variety of cardiac diseases (including coronary artery disease, valvular heart disease, congestive heart failure and cardiac arrhythmias) has been closely linked to the performance of the heart as indicated by measurements such as wall thickening, wall motion, and myocardial mass. Accurate quantitative measures of regional contractile function could therefore have significant prognostic and therapeutic importance. For example, many patients with severe coronary artery disease may have normal regional and global left ventricular function at rest but have abnormalities induced by stress. In clinical practice, patients with coronary artery disease can be detected by stress echocardiography based on new functional deficits during stress. However, interobserver variability of this type of qualitative measure is an inherent limitation that could be improved with quantitative measures. Thus, there is a need for high quality quantitative measures of regional cardiac function.

Segmentation of the left ventricle in MR images is therefore a fundamental step in analyzing the performance of the heart. MR image data of the epicardial boundary is currently acquired by applying a specific sequence of RF pulses to yield a NMR signal that provides information pertaining to the tissue under test. A particular pulse sequence can therefore be applied to obtain a mask of pixels in the intensity range of, for example, a cross-section of the left ventricle tissue. Current processes are available for segmenting the epicardium, but they lack robustness and are difficult to use.

Segmentation methods that are currently available include snake-based techniques such as that described by A. Yezzi, et al. "A Geometric Snake Model for Segmentation of Medical Imagery," IEEE Transaction on Medical Imaging, 16, 199–209 (April, 1997). Snakes, also known as active contours, have been used in an attempt to segment features of the left ventricle. Snakes are described by a parameterized curve whose evolution is determined by the minimization of an energy field. The equation of the energy field, as defined by J. C. Gardner et al. "A Semi-Automated Computerized System for Fracture Assessment of Spinal X-Ray Films," Proceedings of the International Society for Optical Engineering, 2710, 996–1008 (1996), is:

$$E[\vec{x}(s)] \equiv k \int_0^1 ds \left[ \frac{1}{2}\alpha\left(\frac{d\vec{x}}{ds}\right)^2 + \frac{1}{2}\beta\left(\frac{d^2\vec{x}}{ds^2}\right)^2 - \gamma H(\vec{x}(s)) \right] \quad (1)$$

where s is the parameterization variable, $\bar{x}$ is the parameterized curve, κ is the normalization constant, α is the $H(\bar{x})=|\nabla/(\bar{x})|$ tension of the snake, β is the rigidity of the snake, γ controls the attraction to image features, and I is the pixel intensity of the image. H(x) refers to a function which defines the features that attract the snake algorithm to the boundary and, typically, is chosen to be the magnitude of the gradient of the image intensity.

Because the magnitude of the gradient is used to attract the algorithm to the boundary of the left ventricle, the snake does not work well where the boundary is defined by edges that are weak in intensity. In order for the snake algorithm to attach to a boundary, a user must intervene and supply a boundary condition to define the proximity of the boundary for the snake. This is undesirable because the user may need to interact with the segmentation algorithm while the images are being processed. Snake based techniques can be used, as described by Yezzi, to produce a geometric snake model having a stopping term and a constant inflation term added to the evolution equation. The resulting evolution equation of the Yezzi active contour model is:

$$\frac{\partial \Psi}{\partial t} = \phi \|\nabla \Psi\|(\kappa + v) + \nabla \phi * \nabla \Psi \quad (2)$$

here v is a constant inflation force, $$\kappa \equiv div\left(\frac{\nabla \psi}{\|\nabla \psi\|}\right)$$

is the curvature of the level sets of ψ(x, y, t), φ is a function dependent on the type of image and is a stopping term for the curve evolution. Snake based techniques are additionally unfavorable because they rely primarily on edge information only, and therefore are subject to greater error and generally lack robustness, particularly in a clinical setting. S. Ranganath attempted unsuccessfully to segment an epicardium using a snake, as described in "Contour Extraction from Cardiac MRI Studies Using Snakes," IEEE ransactions on Medical Imaging, 14(2), 328–338 (June, 1995).

Another such method currently used in conjunction with attempted detection of epicardial boundaries is a shape-based technique known as the MR Analytical Software System (MASS), introduced by R. J. van der Geest et al. "Comparison Between Manual and Semiautomated Analysis of Left Ventricular Volume Parameters from Short-Axis MR Images," Journal of Computer Assisted Tomogrophy," 21(5), 756–675 (1997), which uses shape as the central principal for the detection of the epicardial and endocardial contours. The MASS algorithm operated by first using a Hough transform, well known in the art, to determine the initial search location for the endocardial and epicardial boundaries. The Hough transform produces a map with high values near the center of approximately circular objects in the original image. A size constraint is then used to narrow a search for circular areas in the image corresponding to the first cardiac phase. After the search determines which circular areas constitute the boundary areas, a line is fit through the Hough images to estimate the center of the left ventricle. The line provides an estimate of the longitudinal axis of the heart.

The MASS algorithm then transforms each image in the study to a polar image and computes a polar edge image. Using a circle estimation from the original image, the intensity of edges in the radial direction, an estimate for myocardial wall thickness, and a maximum likelihood estimate of the endocardial and epicardial radii are calculated. If a satisfactory estimate is not found for the epicardial radius, one is created afterward through linear interpolation between adjacent radii. Once the epicardial boundary has been determined, MASS uses an intensity thresholding technique to find the endocardial boundary. However, because shape-based techniques primarily rely on the shape of the image to produce the outer edge pattern, these methods, like the snake, are subject to error and generally lack robustness.

What is therefore needed is a method and apparatus for segmenting an epicardium in an image that relies on several information sources to produce an image of the left ventricular epicardial boundary that is clinically robust and that operates with greater accuracy than conventional techniques and that requires only minimal user interaction.

SUMMARY OF THE INVENTION

The present invention relates to a system and method for segmenting a human organ, and in particular, a left ventricular epicardium using a method that relies on image shape, gradients, and intensity, and requires only minimal user input to provide a clinically robust mask image of the epicardial boundary of the left ventricle of the heart.

In accordance with a first aspect of the invention, a method for segmenting an image acquired with a medical imaging system to identify the boundary of an organ includes acquiring image data of the organ, and subsequently reconstructing an image of the organ using the acquired image data. Next, an intensity map is produced by segmenting the reconstructed image to produce pixels lying within the boundary of the organ. Next, an edge map is created by detecting the edges of the reconstructed image, and information from the edge map is used to refine the intensity map so as to include variations in intensity corresponding to the outer boundary of the organ. Once the intensity map is refined, a center of the organ is located and the intensity map is searched outwardly from the center to locate the variations in intensity. An image of the outer boundary corresponding to the variations is then generated.

BRIEF DESCRIPTION OF THE DRAWINGS

Reference is hereby made to the following figures in which like reference numerals correspond to like elements, and in which:

FIG. 2 is a schematic map corresponding generally to a nuclear magnetic resonance image of a chest cavity in accordance with the preferred embodiment;

FIG. 5 is a representation of a kernel used in combination with the dilation step in the process of FIG. 4;

FIG. 6 is a graphical representation of a blood pool mask in accordance with the preferred embodiment;

GENERAL DESCRIPTION OF THE INVENTION

An epicardial detection process is performed on an acquired MR image by an image processor. Specifically, a blood pool mask is created and subsequently dilated to obtain an expanded, dilated, mask. Next, the blood pool mask is subtracted from the dilated mask to produce a boundary mask. The dilation process is repeated so as to produce a plurality of boundaries, which represent the radially outwardly advancing boundary of the dilated mask toward the epicardium during successive iterations. The mean and standard deviation of the resulting intensity values corresponding to the boundaries are calculated and stored in an array. The dilations repeat until the dilation boundary grows beyond the epicardium, and into the other areas surrounding the heart. As the boundary moves beyond the outer wall of the left ventricle, the boundary will encounter areas of vastly different pixel intensities due to the different tissue compositions of the regions beyond the heart. The behavior of the calculated standard deviation will reflect the boundary advancing from the endocardium to the epicardium and also will display predictable behavior when the boundary moves away from the epicardium into other areas surrounding the heart. The changes in standard deviation as each iteration is performed provides a relatively accurate approximation of the region containing the epicardial boundary. Finally, the process computes an intensity range for the mask, and an intensity map is created.

The next step is to generate an edge map for the intensity map by histogramming a gradient map of the image and discarding values in the gradient map that fall below a predetermined threshold. The gradient values which remain are defined as the edge map. Next, the edge map is subtracted from the intensity map. The intensity map with edge map removed is then altered to remove the blood pool as well as any additional islands in the image that might exist as the result of noise, for example, so as to produce a final classification map.

The mask for the blood pool is then used to determine an approximate location for the center of the left ventricle. To determine the boundary points of the epicardium, rays are cast outwardly from the center in search of a transition from a non-mask intensity value (indicative of the rays traversing the location formerly occupied by the blood pool) to a mask intensity value (indicative of the rays traversing the myocardium) and again to a non-mask value (indicative of the rays traversing the epicardium). Once the boundary is produced, a smoothing process is performed to create a smooth curve representing the epicardial boundary of the left ventricle. It should be appreciated in this regard that the term "blood pool" as used in accordance with the preferred embodiment refers to the blood mass inside the left ventricular chamber of the heart.

DETAILED DESCRIPTION OF THE PREFERRED EMBODIMENT

Figure 1:
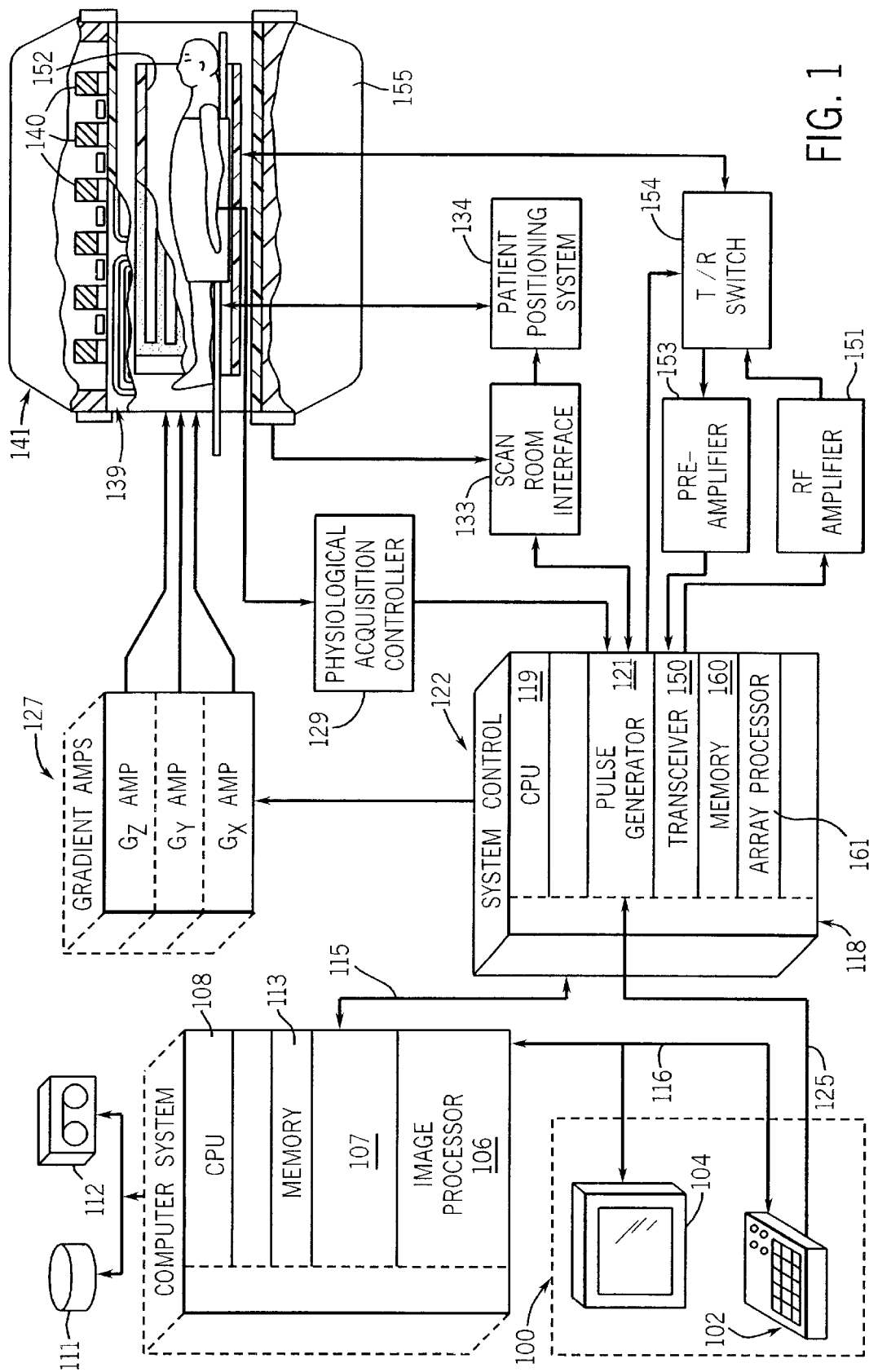
FIG. 1 is a block diagram of an MRI system which employs the preferred embodiment of the present invention.

Referring initially to FIG. 1, there is shown the major components of a preferred magnetic resonance imagine (MRI) system which incorporates the present invention. The operation of the system is controlled from an operator console 100 which includes a keyboard and control panel 102 and a display 104. The console 100 communicates through a link 116 with a separate computer system 107 that enables an operator to control the production and display of images on the screen 104. The computer system 107 includes a number of modules which communicate with each other through a backplane 118. These include an image processor module 106, a CPU module 108 and a memory module 113, known in the art as a frame buffer for storing image data arrays. The computer system 107 is linked to a disk storage 111 and a tape drive 112 for storage of image data and programs, and it communicates with a separate system control 122 through a high speed serial link 115.

The system control 122 includes a set of modules connected together by a backplane. These include a CPU module 119 and a pulse generator module 121 which connects to the operator console 100 through a serial link 125. It is through this link 125 that the system control 122 receives commands from the operator which indicate the scan sequence that is to be performed. The pulse generator module 121 operates the system components to carry out the desired scan sequence. It produces data which indicates the timing, strength and shape of the RF pulses which are to be produced, and the timing of and length of the data acquisition window. The pulse generator module 121 connects to a set of gradient amplifiers 127, to indicate the timing and shape of the gradient pulses to be produced during the scan. The pulse generator module 121 also receives patient data from a physiological acquisition controller 129 that receives signals from a number of different sensors connected to the patient, such as ECG signals from electrodes or respiratory signals from a bellows. And finally, the pulse generator module 121 connects to a scan room interface circuit 133 which receives signals from various sensors associated with the condition of the patient and the magnet system. It is also through the scan room interface circuit 133 that a patient positioning system 134 receives commands to move the patient to the desired position for the scan.

The gradient waveforms produced by the pulse generator module 121 are applied to a gradient amplifier system 127 comprised of $G_x$, $G_y$ and $G_z$ amplifiers. Each gradient amplifier excites a corresponding gradient coil in an assembly generally designated 139 to produce the magnetic field gradients used for position encoding acquired signals. The gradient coil assembly 139 forms part of a magnet assembly 141 which includes a polarizing magnet 140 and a whole-body RF coil 152. A transceiver module 150 in the system control 122 produces pulses which are amplified by an RF amplifier 151 and coupled to the RF coil 152 by a transmit/ receive switch 154. The resulting signals radiated by the excited nuclei in the patient may be sensed by the same RF coil 152 and coupled through the transmit/receive switch 154 to a preamplifier 153. The amplified NMR signals are demodulated, filtered, and digitized in the receiver section of the transceiver 150. The transmit/receive switch 154 is controlled by a signal from the pulse generator module 121 to electrically connect the RF amplifier 151 to the coil 152 during the transmit mode and to connect the preamplifier 153 during the receive mode. The transmit/receive switch 154 also enables a separate RF coil (for example, a head coil or surface coil) to be used in either the transmit or receive mode.

The NMR signals picked up by the RF coil 152 are digitized by the transceiver module 150 and transferred to a memory module 160 in the system control 122. When the scan is completed and an entire array of data has been acquired in the memory module 160, an array processor 161 operates to Fourier transform the data into an array of image data. It should be appreciated that while the Fourier transform is used in accordance with the preferred embodiment, other suitable techniques could be used. This image data is conveyed through the serial link 115 to the computer system 107 where it is stored in the disk memory 111. In response to commands received from the operator console 100, this image data may be archived on the tape drive 112, or it may be further processed by the image processor 106 and conveyed to the operator console 100 and presented on the display 104.

For a more detailed description of the transceiver 150, reference is made to U.S. Pat. Nos. 4,952,877 and 4,922,736, which are incorporated herein by reference.

The MRI system of FIG. 1 performs a series of suitable pulse sequences to collect sufficient NMR data so as to produce an image of the left ventricle, as is well known in the art. FIG. 2 illustrates a schematic representation of a typical chest cavity image identifying a human heart 169 having a left ventricle 172, a blood pool 174, and an epicardium 182. A lung field 170 surrounds or partially surrounds the heart 169.

Figure 3:
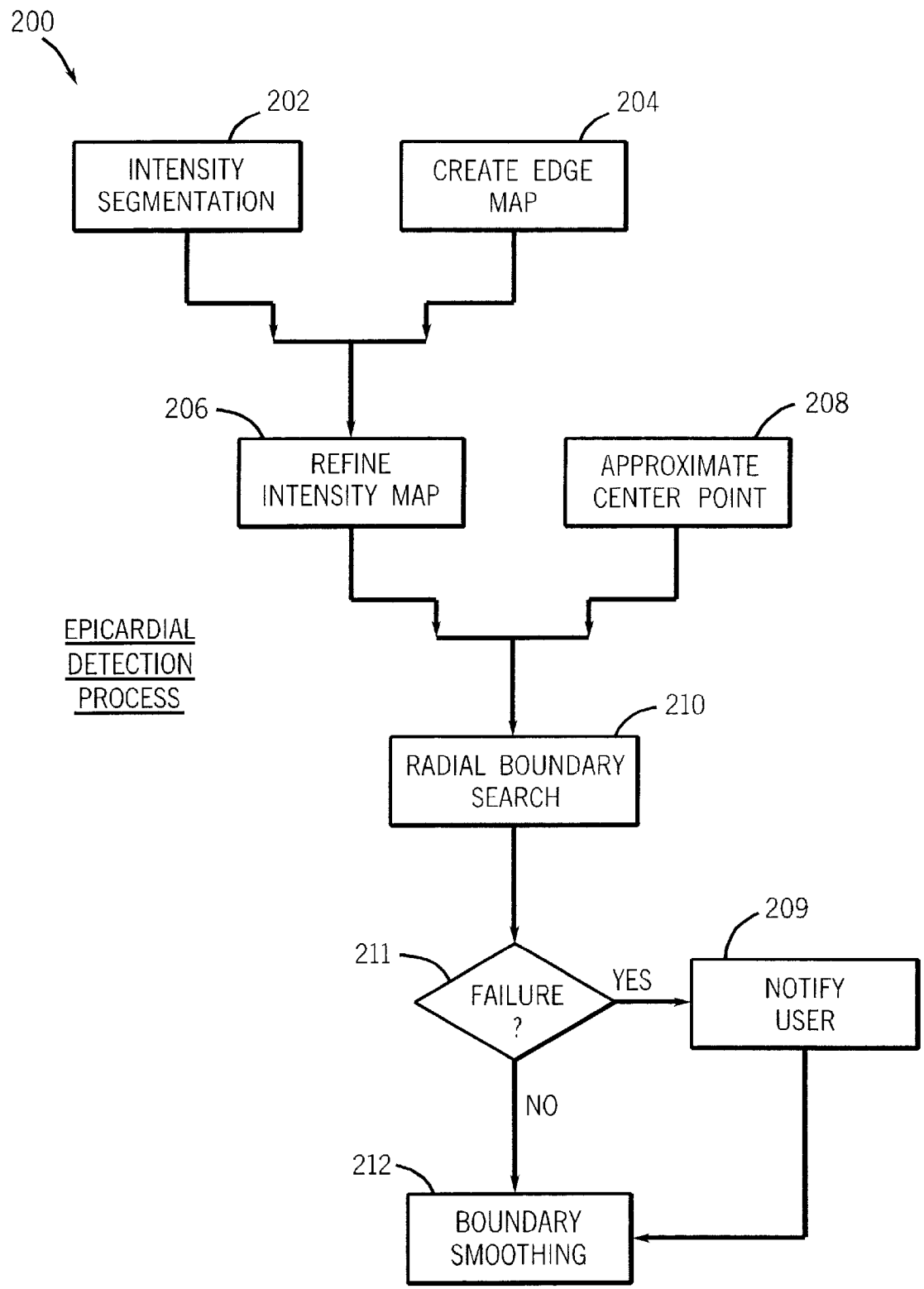
FIG. 3 is a flow chart of the steps performed with the MRI system to carry out the preferred embodiment.
Figure 4:
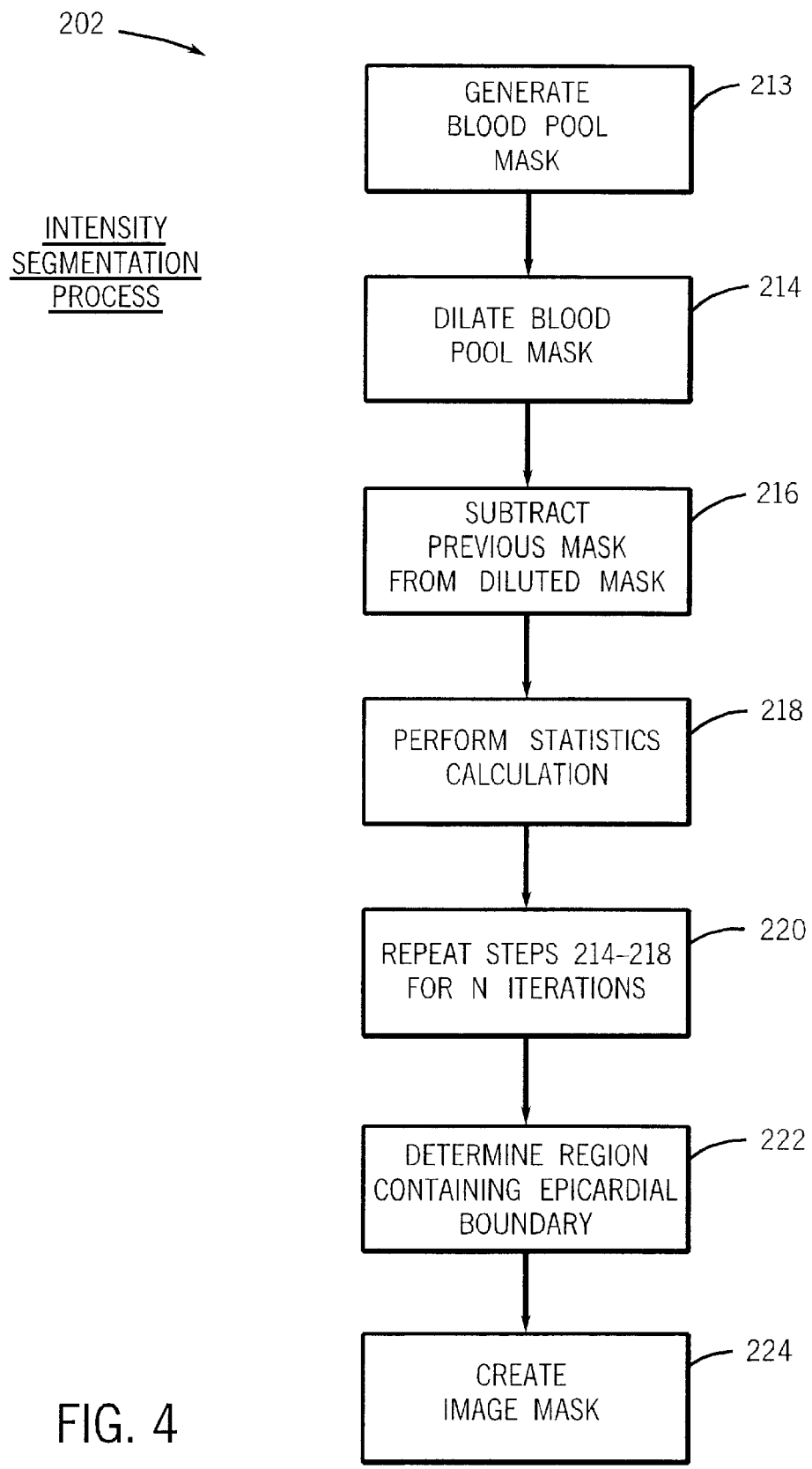
FIG. 4 is a flow chart of the steps performed to carry out the intensity segmentation process that forms part of the method of FIG. 3.
Figure 7:
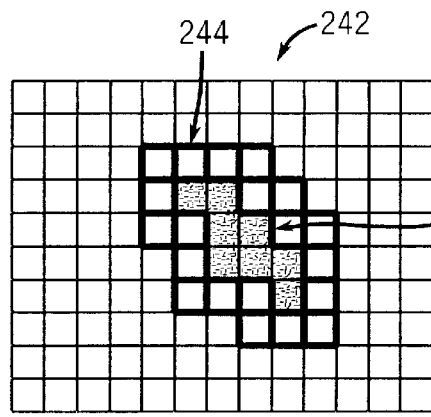
FIG. 7 is a graphical representation of FIG. 6 once dilated in accordance with the preferred embodiment.

Referring now to FIG. 3, an epicardial detection process 200 is performed on the acquired image data by the image processor 106. The first step indicated at process block 202 determines a pixel intensity range in the image for the muscle comprising the left ventricle. This intensity segmentation process 202 is illustrated in more detail in FIG. 4, which begins at step 213 by producing a blood pool mask 228 illustrated in FIG. 6. The blood pool mask 228, as illustrated, is defined by a rectilinear grid 230 having shaded pixels 232 that are turned "on" to represent the structure of interest (blood pool), and clear pixels 234 that are turned "off" to represent space not occupied by the blood pool. Next, at step 214, the blood pool mask 228 is dilated, using a morphological operator that defines a method for expanding a binary mask, and is defined by the following equation:

$$X \oplus B \equiv \{x : B_x \cap X \neq \phi\} \qquad (3)$$

where X is the image; B is a structuring element represented by kernel 236 illustrated in FIG. 5; $B_x$ is the translation of B such that its origin is at x; and x is a specific pixel. The structuring element B is moved across the blood pool mask 228. When a pixel 238 in B is "on" and the corresponding pixel in the blood pool mask is "on," then the pixel in the blood pool mask 228 corresponding to the center of B 240 is turned "on." FIG. 7 illustrates a mask 242 of the blood pool mask 228 once dilated, and having an outer boundary 244 surrounding the image 232.

Figure 8:
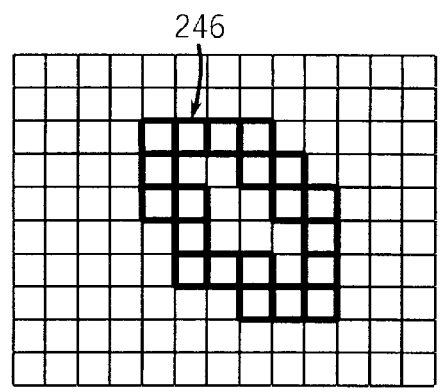
FIG. 8 is a dilation mask obtained by the subtraction of the mask illustrated in FIG. 6 from the mask illustrated in FIG. 7.

Once the original blood pool mask 228 has been dilated, the blood pool mask 228 is subtracted from the dilated mask 242 at step 216 to produce a one-pixel wide boundary 246 illustrated in FIG. 8. The subtraction is defined by the following operation:

$$X_n - X_{n-1} \equiv \{x : X_n \cap X_{n-1} = \phi\} \qquad (4)$$

where $X_n$ is the blood pool mask dilated n times, and $X_{n-1}$ is the blood pool mask dilated n−1 times. The boundary 246 therefore represents the advancing boundary of the dilated mask 242 as shown in FIG. 8.

The intensity segmentation process 202 then continues at step 218 and performs a statistics calculation of the dilation $10_x$ boundary 246. In particular, first order statistics are calculated for the dilation boundary 246. The mean of the sample is defined by the equation:

$$\bar{x} = \frac{1}{n} \sum_{i=1}^{n} x_i \qquad (5)$$

where n is the number of pixels defining the dilation boundary 246; and $x_i$ is the intensity of a pixel in the dilation boundary. The standard deviation metric SD of the intensity of the sample is defined by the equations:

$$\bar{v} = \frac{1}{n-1} \sum_{i=1}^{n} (x_i - \bar{x})^2 \qquad (6)$$

See A. Papoulis, "Probability, Random Variables, and Stochastic Processes," (Third Edition), New York, N.Y.: McGraw Hill, Inc. (1991), citing equations (5) and (6), and $$SD = \sqrt{\bar{v}} \qquad (7)$$

where $\bar{v}$ is variance. At step 220, the intensity segmentation process repeats steps 214–218 to once again dilate the once dilated mask 242, perform the subtraction of the previous mask from the newly dilated mask, and finally perform the statistics calculation. These dilation iterations are performed N times, where N is chosen to be sufficiently large to ensure that the dilation boundary 246 grows beyond the epicardium 182 and into the areas surrounding the heart 169. Thus, N depends primarily on the field of view of the image. If the field of view is small, resulting in the heart occupying a large portion of the image, N would increase. If, however, the field of view is large, resulting in the heart occupying a smaller portion of the image, N may be decreased to save computation time. N is set to 15 in accordance with the preferred embodiment.

Figure 9:
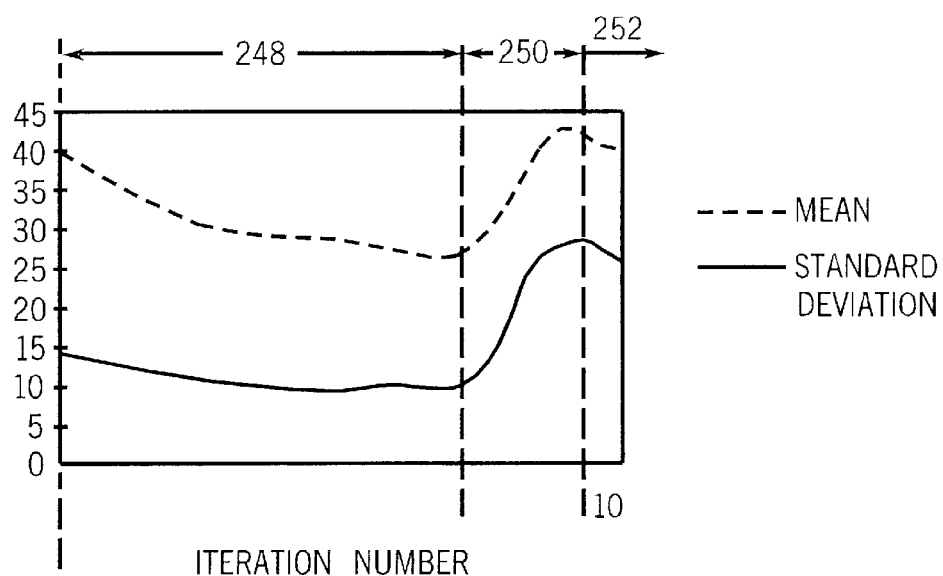
FIG. 9 is a graph of the mean and standard deviations plotted against the natural log of the corresponding dilation iteration number in accordance with the preferred embodiment.

Because it is desirable to calculate an intensity map (as described below) which includes the left ventricle 172 and excludes as many surrounding areas as possible, it is of interest to calculate the statistics indicative of the point at which the boundary 246 has moved beyond the epicardium 182. Therefore, once N is satisfied, the intensity segmentation process 202 proceeds to step 222, where the point at which the outer boundary 246 crosses the outer wall of the left ventricle 172 is determined. As this occurs, the boundary 246 will encounter vastly differing pixel intensities, which are the result of the different tissue compositions of the regions beyond the heart 169, for example the lungs and the diaphragm (not shown). FIG. 9 illustrates a graph of the mean and standard deviation of intensity values corresponding to the boundary 246 plotted against the natural log of the iteration number. As illustrated, as the boundary 246 advances from the endocardium, the standard deviation gradually decreases, as indicated in FIG. 9 at 248, until the boundary 246 begins to reach the epicardium 182. At this point, the standard deviation begins to increase significantly, as indicated in FIG. 9 at 250. The standard deviation then begins to decrease once again as the boundary 246 moves away from the epicardium 182 and begins to move through more homogeneous materials. The boundary 246 defined by the maximum change in standard deviation yields a good approximation of the region containing the epicardial boundary, and is defined by the following equation:

$$\Delta SD_n = \left| \frac{SD_n - SD_{n-1}}{ln(n) - ln(n-1)} \right| \quad (8)$$

where $SD_n$ is the standard deviation metric for n; and $SD_{n-1}$ is the standard deviation for iteration n−1.

Figures 10, 11:
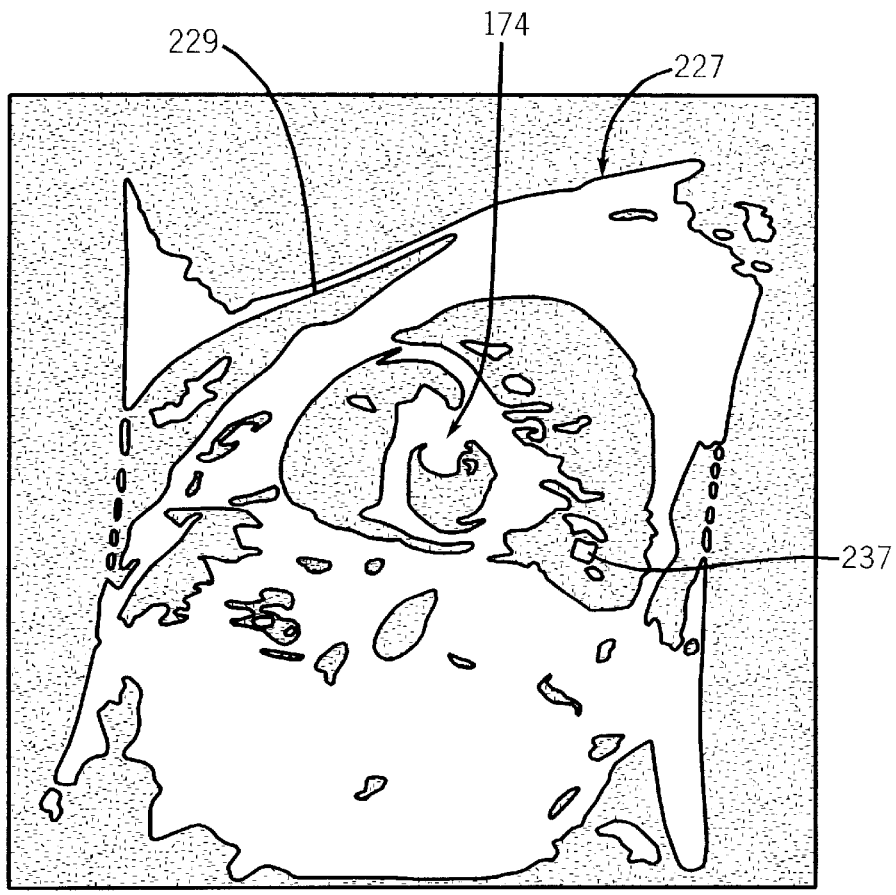
FIG. 10 is an intensity map in accordance with the preferred embodiment.
FIG. 11 is a diagram of a plurality of compass operators used in conjunction with the "create edge map" step of FIG. 7.

The statistical data from the iteration having the largest $\Delta SD$ are used to calculate the intensity range for an intensity map 227, as illustrated in FIG. 10.

The intensity segmentation process is completed at step 224, whereby the intensity map 227 is defined by the following equation:

$$M \equiv \{p : SD - \alpha \bar{x} \leq ICp \leq SD + \beta \bar{x}\} \quad (9)$$

where p is a specific pixel; I(p) is the intensity of p; SD is the standard deviation from equation (7); x is the sample mean from equation 6; and α and β are constants. In accordance with the preferred embodiment, α and β are empirically derived to yield a map having a predetermined intensity range. The intensity map 227 as illustrated in FIG. 10 contains a blood pool 174, edges 229, and islands 233.

The intensity map 227 that was produced by the intensity segmentation block 202 represents an image having "on" values for pixels that are inside the intensity range, and "off" values for those pixels outside the intensity range. Some of the intensity variations will define the left ventricular epicardial boundary while others define images such as the blood pool 174, edges 229 and islands 233. Accordingly, once the intensity map 227 is refined to produce a classification map lacking the blood pool 174, edges 229, and islands 233, boundary points that define the epicardial boundary will be detected based on the remaining intensity variations, as ill be described below.

Figure 12:
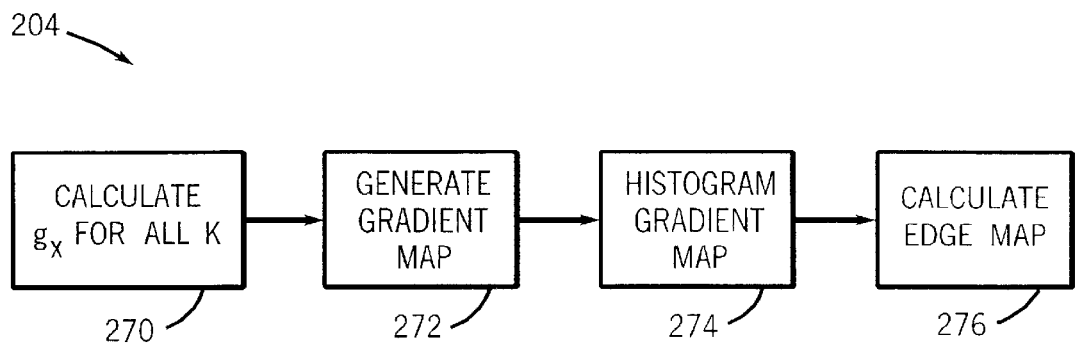
FIG. 12 is a flow chart of the process performed to carry out the "create edge map" step that forms part of the method of FIG. 3.

Referring again to FIG. 3, the epicardial detection process 200 next generates an edge map for the image at step 204 using a plurality of compass operators. Compass operators are functions which measure gradients in intensity for a selected number of directions, and were chosen in accordance with the preferred embodiment due, in part, to their low computational requirements. Step 204 is illustrated in detail in FIG. 12 in which the first step 270 calculates the intensity gradient at a given location (m,n) as defined by the following equation:

$$g(m,n) \equiv \max_k \{|g_k(m,n)|\} \quad (10)$$

Where $g_k(m,n)$ is the compass operation in the direction $\theta_k$ for k=0, . . . 7; and $\theta_k$ is the gradient direction for a given compass operator. The compass operators can be calculated from a weighted average of the pixel values in the acquired image. A full set of compass operators can be represented by the following kernels 254, 256, 258, 260, 262, 264, 266, and 268 representing kernels positioned north, northwest, west, southwest, south, southeast, east, and northeast, respectively, as shown in FIG. 11. It can be observed that pixel values are positive in the direction representing the overall position of the kernel, negative in the direction opposite that representing the kernel separated by pixels of 0. For example, kernel 254 includes positive pixels in the north direction, negative kernels in the south, separated by a row of kernels of 0.

The values of the elements of each kernel are used as multiplicative weights for the pixels in the neighborhood of interest to determine the gradients in each direction. After $g_k$ is calculated for all k at a given pixel at step 270, the maximum value of $g_k$ is used to represent the gradient magnitude at that pixel. A gradient map is then calculated for the entire image at step 272. The intensity values of the gradient map are histogrammed at step 274. To generate the edge map at step 276, a gradient threshold is selected whereby all values in the gradient map falling below the designated threshold are ignored. The gradient threshold is adjustable, and is set to 20% in the preferred embodiment, thereby retaining those pixels having intensity values falling within the top 20%, and discarding the remaining 80% of the pixels. The gradient values which remain after the thresholding step are defined to be the edge map corresponding to the edges 229 in the intensity map 227.

Figure 13:
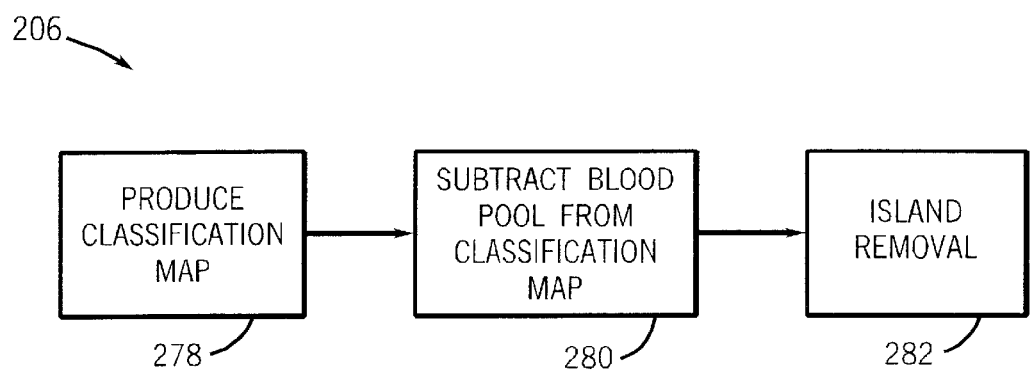
FIG. 13 is a flow chart of the process performed to carry out the "refine intensity map" step in the method of FIG. 3.

Referring again to FIG. 3, once the intensity and edge maps are created, the epicardial detection process 200 refines the intensity map 227 at step 206. As shown in more detail in FIG. 13, the intensity map 227 defines the areas that contain pixels in the intensity range of interest. The edge map defines strong edges in the image, some of which likely defining the epicardial boundary. The intensity map 227 and edge map are combined by subtracting the edge map from the intensity map to produce a classification map (not shown) at step 278. The subtraction is performed according to the technique described above with reference to Equation 4.

The classification map therefore defines the areas of proper intensity, with edges 229 of interest being cut out of the intensity map 227. To further refine the classification map, the first dilation of the blood pool mask 228 is subtracted from a classification mask (corresponding to the classification map) at step 280 to produce a classification map with the blood pool 174 removed. Subtracting the blood pool mask 228 removes stray pixels in the blood pool 174 which may have been in the intensity range of the epicardium 182, as a pixel cannot be a member of both the blood pool and the epicardium.

Figure 14:
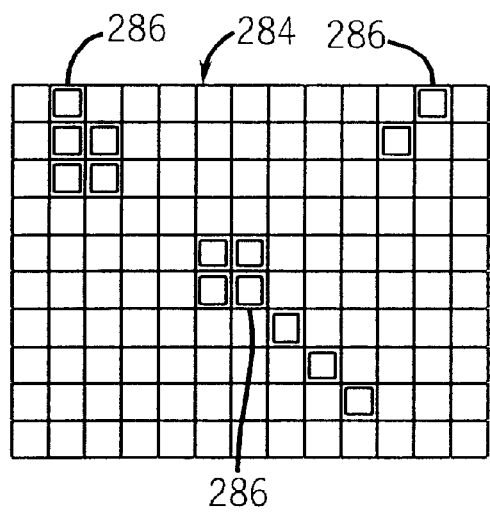
FIG. 14 is a mask representing an image containing islands in accordance with the preferred embodiment.
Figure 15:
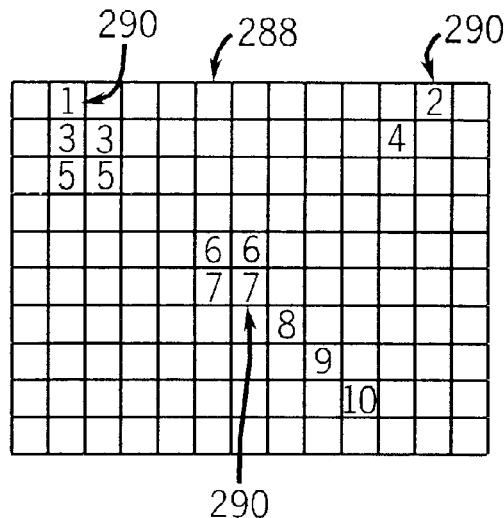
FIG. 15 is a mask corresponding to FIG. 14 with the "on" pixels labeled.
Figure 16:
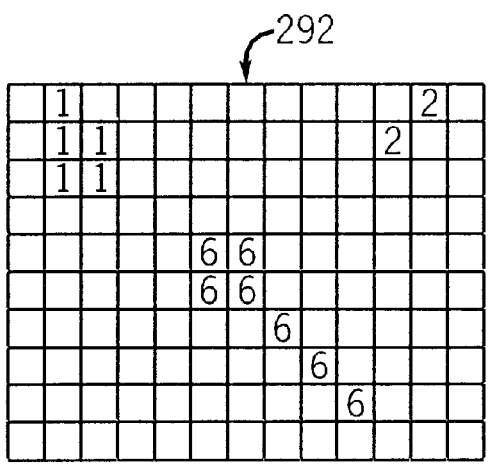
FIG. 16 is a mask corresponding to FIG. 15 with the islands joined.
Figure 17:
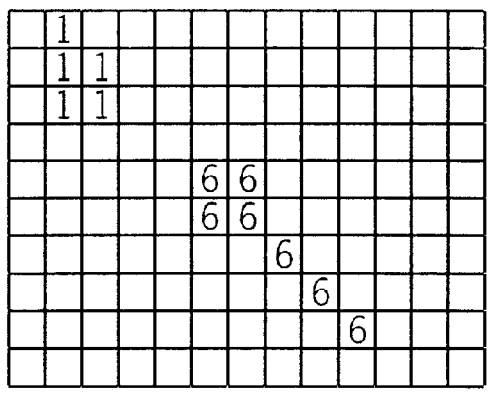
FIG. 17 is a mask corresponding to FIG. 16 with the island removal process completed in accordance with the preferred embodiment.
Figure 18:
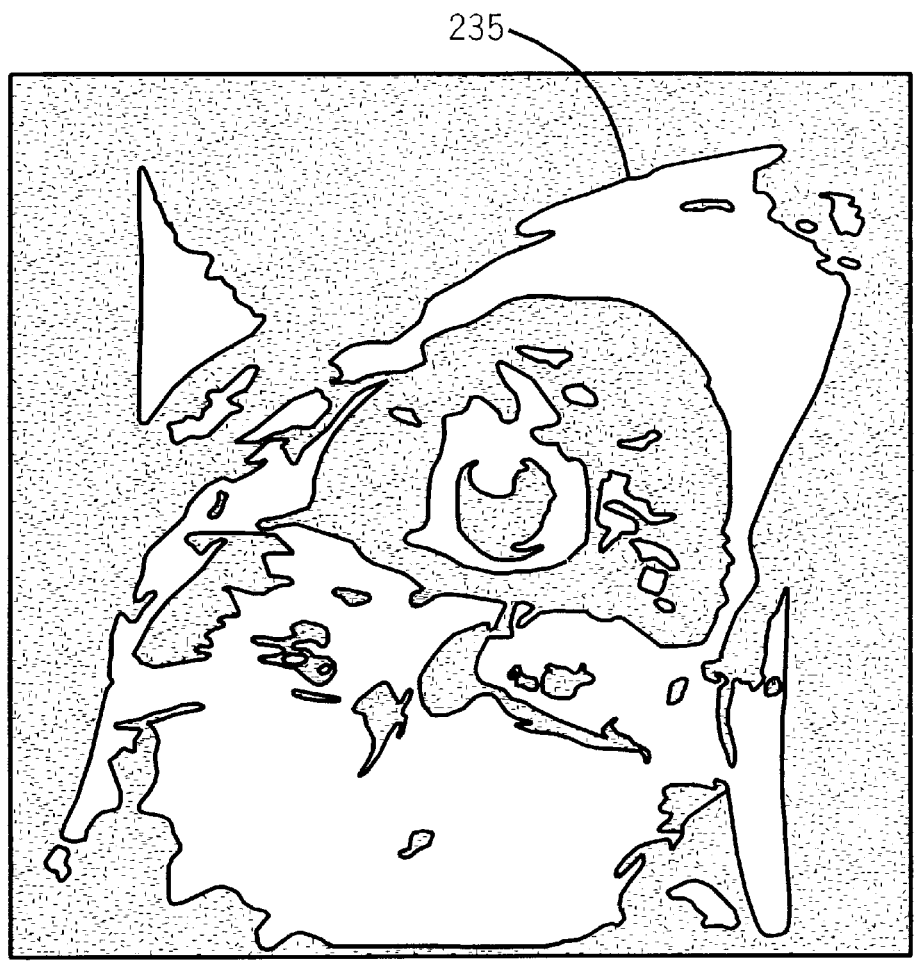
FIG. 18 is the intensity map of FIG. 10 having the edges, islands, and blood pool removed in accordance with the preferred embodiment.

Next, with continuing reference to FIG. 3, an island removal process is performed at step 282, whereby small groups of pixels are removed to reduce noise in the mask and to increase the probability of choosing a correct epicardial boundary. Such groups of pixels, or "islands," are illustrated in FIG. 10 at 237. The island removal process 282 is an iterative process which employs the mask 284 of FIG. 14 and identifies areas of structure ("on" pixels) 286. In particular, the mask 284 is scanned from left to right in each row, starting with the upper left corner. Each non-adjacent "on" pixel 286 is labeled with successive numbers to produce a labeled image 288, as illustrated in FIG. 15. The labels are then merged, as shown in FIG. 16, by scanning the labeled image 288 and joining pixels that are connected. For example, when scanning the labeled image 288, the first value encountered in the first row is a "1". Connected to that pixel labeled "1" are two other pixels labeled "3". The pixels labeled "3" are replaced with "1" since they are connected. A "merged labels" image 292, illustrated in FIG. 16, is produced as a result of merging and labeling all of the islands 290 in the labeled image 288. Finally, the island removal process histograms and thresholds the image 292. If an island does not include enough labeled pixels (i.e. the island's pixel count value is not above a predetermined threshold), all pixels in that island are turned off. The threshold should be set so as to remove those islands which are small enough to be properly attributable to noise while retaining those that are representative of anatomy, and is set to 50 in accordance with the preferred embodiment. In the illustrated example, in FIG. 16, because the island labeled "2" did not meet the threshold, the pixels corresponding to that island have been turned "off" in FIG. 17. FIG. 18 illustrates a final classification map 235 after the edges 229, blood pool 174, and islands 237 have been removed.

Referring again to FIG. 3, once the intensity map is refined at step 206, the epicardial detection process 200 executes step 208 to approximate the center point of the left ventricle using the blood pool mask 228. The following mass equations are used to calculate the center of the blood pool 174:

$$x_c = \frac{1}{M} \int_R \int x \rho(x, y) dA \qquad (11)$$

$$y_c = \frac{1}{M} \int_R \int y \rho(x, y) dA \qquad (12)$$

where $x_c$ is the x coordinate of the center point; $y_c$ is the y coordinate of the center point; R is the region of interest; $\rho(x,y)$ is the density function; dA is an element of infinitesimal area; and M is the total mass, as defined by:

$$M \equiv \int_R \int \rho(x, y) dA \qquad (13)$$

Figure 19:
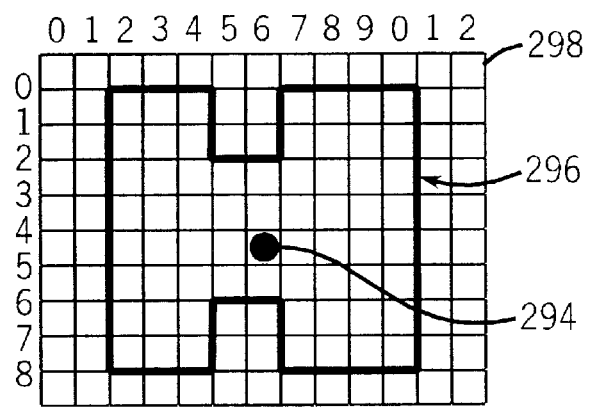
FIG. 19 is a graphical representation illustrating a center of mass calculation in accordance with the preferred embodiment.

To find the center of the blood pool 174, R is taken to be the blood pool mask. Because all pixels in the blood pool mask 228 are of equal value, $\rho(x,y)$ can be taken as 1 to indicate constant density. M therefore reduces to the total area of the blood pool 174. Using these simplifications, and recognizing that the image data is represented as discrete pixel values, equations (12) and (13) may be rewritten, respectively, as:

$$y_c = \frac{1}{N} \sum_y \sum_x y \qquad (14)$$

$$x_c = \frac{1}{N} \sum_y \sum_x x \qquad (15)$$

where N is the number of pixels in the blood pool mask 228. It should be appreciated that equations (14) and (15) are simply the average values for x and y, respectively, for the points contained in the blood pool mask 228. FIG. 19 illustrates an example calculation of center of mass 294 ($x_c$, $y_c$) for an object 296 outlined in Cartesian space, having grid lines 298 representative of pixel location. In the illustrated example, $x_c$=6.025 (388/64), and $y_c$=5.0625 (324/64).

Figure 21:
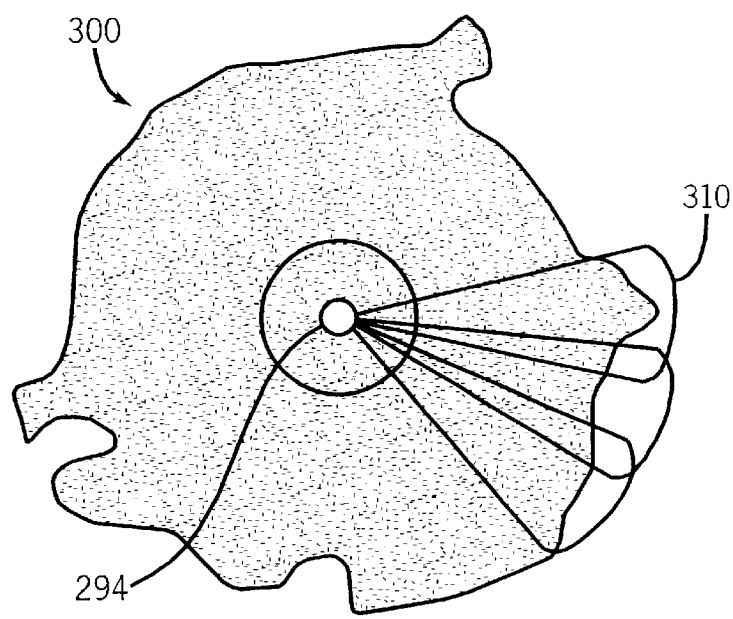
FIG. 21 is an illustration of the boundary smoothing process of an picardial boundary in accordance with the preferred embodiment.

Referring again to FIG. 3, the calculated center point 294 is used with the intensity map 227 to find an approximate epicardial boundary in a radial boundary search process 210. As shown in FIG. 21, rays (not shown) are cast radially outwardly from the center point 294 in search of a transition from a first non-mask intensity value to a mask intensity value, and then back to a second non-mask intensity value. The first non-mask value is representative of the rays traversing the location formerly occupied by the blood pool 174; the mask-value is representative of the rays crossing the myocardium; and the second non-mask value is representative of the rays crossing the epicardium 182. Because the edges 229 have been removed during step 206, many areas of the epicardium 182 are sufficiently defined. In some areas, however, where no strong edge was present and the intensity range is therefore that of the myocardium, a reliable approximation of the epicardial boundary 300 may not exist. In this case, the search will fail at decision block 211, and the radial value stored for the search will be the final distance at which the search was attempted. A direct correlation exists between the number of radii having no reliable definition of the corresponding epicardial boundary 300 and the successful completion of the epicardial detection process 200. The ability to detect failure, therefore, is particularly useful when providing a completely automated segmentation of a dataset. The failure may be communicated to the user at step 209 so that particular attention may be given to reviewing those images identified as having a failed boundary. Therefore, even though a failure may have been detected, the epicardial detection process 200 will proceed after notifying the user of the failure, as will now be described.

Figure 20:
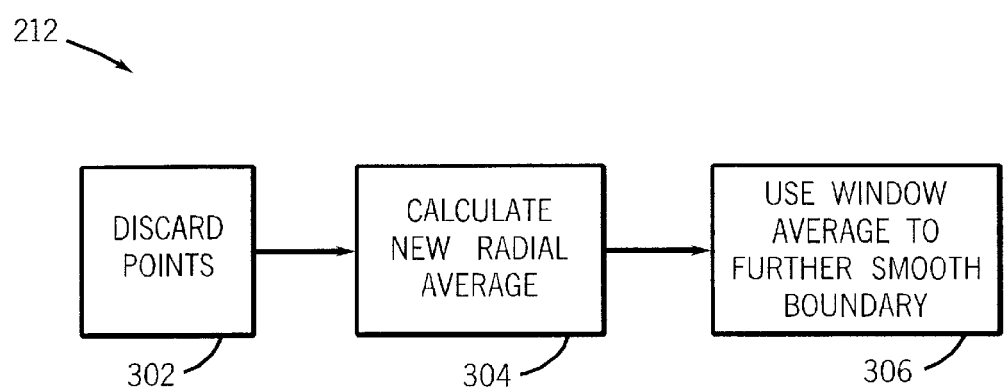
FIG. 20 is a flow chart of the process performed to carry out the boundary smoothing step in the method of FIG. 3.
Figure 22:
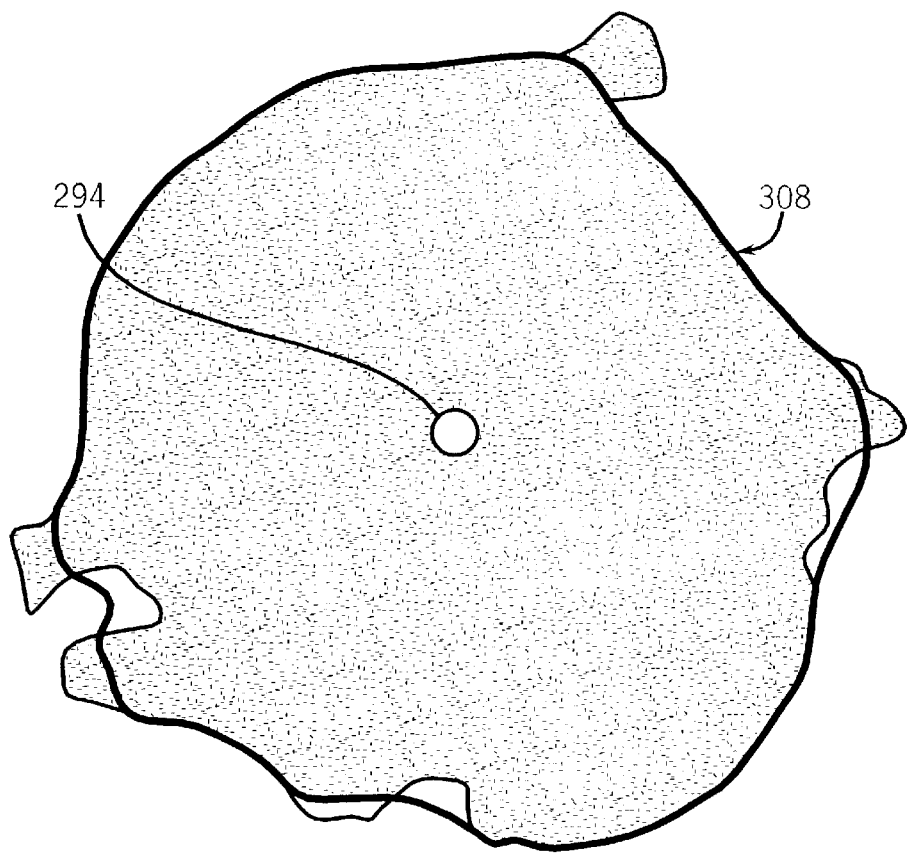
FIG. 22 is the boundary of FIG. 21 with the boundary smoothing process completed.

Once the epicardial boundary points 300 are determined, and after any failures have been communicated to the user, a boundary smoothing process 212 is performed to transform the boundary points into a smooth closed curve 308 as illustrated in FIG. 22. The boundary smoothing process 212 is illustrated in detail in FIG. 20 and begins at step 302, where any points having a small probability of actually being on or near the epicardial boundary are discarded, as defined by a thresholding operation:

$$\hat{R} \equiv \left\{ r: \begin{cases} r & (1-\gamma)*r_{ave} \leq r \leq (1+\gamma)*r_{ave} \\ r_{ave2} & \text{otherwise} \end{cases} \right\} \qquad (16)$$

where $\hat{R}$ is the set of all radii defining an estimate of the epicardial boundary; r is a specific radius; $r_{ave}$ is the average value of all radii prior to thresholding; $r_{ave2}$ is the average value of all radii within the threshold; and γ is the threshold coefficient. Once all radii exceeding the threshold have been removed, a new radial average ($r_{ave2}$) is calculated at step 304, and radii exceeding the threshold are replaced with $r_{ave2}$. This produces a set of boundary points 300 that are all within the empirically derived threshold.

Once the refined estimate of the boundary points 300 is obtained, the radii values are further smoothed at step 306 to obtain a smooth, closed curve 308 representing the epicardial boundary using a window averaging technique. Specifically, a moving window 310 is applied to all radii in the refined boundary 300 as shown in FIG. 21. The average of all radii within the window is calculated. If the radius under test falls outside an empirically derived interval around the window average, then that radius will be replaced with the window average. The operation continues until a window has been produced around each radius in the set, thereby completing a 360° revolution around the center 294.

It should be appreciated that the preferred embodiment, while illustrated to segment a left ventricular epicardium in MR images, may also be used to segment cardiac images acquired with other imaging modalities such as x-ray, x-ray CT, ultrasound, and nuclear. Indeed, the present invention may be expanded to segment other bodily organs.

While the steps performed in accordance with the preferred embodiment have been described, alternate embodiments may be implemented to improve the epicardial detection process 200. In particular, factors such as speed and memory conservation are desirable for use in a clinical setting. This may be achieved by 1) combining the dilation and statistics calculation steps 214 and 218, 2) simplifying the edge detection process 204, and 3) reducing the number of floating point calculations.

The dilation and statistics calculation steps 214 and 218 may be improved by calculating the statistics during the dilation step. Calculating the statistics for each dilation iteration while the $\bar{x}$ dilation kernel is moving through the image foregoes the need for additional passes through the image. Calculation of the mean $\bar{x}$ may also be expedited by summing the values of each pixel added by the dilation kernel 236. Once the dilation kernel 236 has passed completely through the image 228, the only additional step necessary to calculate the mean $\bar{x}$ is to divide the sum of the added pixels by the number of added pixels.

To increase the speed of calculating the standard deviation metric SD, Equation 6 may be rearranged to allow partial terms of the variance $\bar{v}$ to be calculated as follows:

$$\bar{v} = \frac{1}{n-1}\left[\sum_{i=1}^{n} x_i^2 - 2\bar{x}\sum_{i=1}^{n} x_i + n\bar{x}^2\right] \quad (17)$$

Equation 17 provides a way to calculate the variance during the dilation, or "on the fly." Specifically, the first term is calculated by summing the squares of the pixel values for each pixel added by the dilation kernel 236. The second term is twice the mean $\bar{x}$ after the dilation kernel 236 has passed completely through the image 228. The final term is calculated after $\bar{x}$ the dilation is complete by squaring the mean and multiplying by the pixel counter used to compute the mean.

Because the statistics are being calculated on the fly, it is not necessary to store copies of the dilated masks 242 for later statistics calculations. However, a dilated blood pool is still needed later in the process to clean up the binary pixel mask. Therefore, in the dilation process, rather than adding every dilated pixel with the same intensity value in the dilation mask 242, a pixel value may be used which is related to the iteration number. For example, the original blood pool mask 228 may be stored with a value of 1, with the values incrementing by 1 as successive iterations are performed. Accordingly, the results of all dilations may be stored in one image mask for future access while conserving memory space.

The edge detection process 204 may also be modified to increase the speed of the epicardial detection process 200. For example, a mere sign difference separates those compass operators indicating north 254 and those indicating south 262. Because only the magnitude of the operators is used when calculating the edge map, only one of the operators need be used. The result is a reduction of the number operators needed to calculate the edge map by a factor of two. Additionally, because the compass operators rotated at 45° (256, 260, 264, and 268) provide little additional information, they may be eliminated altogether. While this step does minimally decrease the accuracy of the edge map, it provides benefits in time conservation. Accordingly, only two compass operators need to be used—one along the north-south direction, and one along the east-west direction.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

What is claimed is:

1. A method for segmenting an image acquired with a medical imaging system to identify the boundary of an organ, comprising:

A. acquiring image data of said organ with said medical imaging system;

B. reconstructing an image corresponding generally to said organ using said acquired image data;

C. producing an intensity map having pixels lying within said boundary of said organ by segmenting the reconstructed image, including the steps of:

i. dilating said acquired image data so as to produce a dilated image;

ii. generating a dilation boundary by subtracting said reconstructed image from said dilated image; and iii. generating said intensity map based, at least in-part, on intensity values corresponding to said dilation boundary;

D. creating an edge map by detecting edges of said reconstructed image;

E. refining said intensity map by using information in said edge map so as to include variations in intensity corresponding to said boundary of said organ;

F. locating a center of said organ;

G. searching radially outwardly from said center to locate said variations in intensity;

H. generating an image of said outer boundary based, at least in-part, on said variations, I. iteratively moving said dilation boundary radially outwardly;

J. calculating a standard deviation of intensity values corresponding to the dilated boundary for each iteration; and K. determining that said dilation boundary has moved across said outer boundary based on a characteristic of said standard deviation.

2. The method as recited in claim 1, wherein step (G) further comprises iteratively searching radially outwardly from said center to determine a plurality of n outer boundary points corresponding to each of said variations.

3. The method as recited in claim 1, wherein said pixels define portions of said organ falling within a predetermined intensity range.

4. The method as recited in claim 3, wherein said portions of said organ include a blood pool, further comprising removing pixels corresponding to said blood pool from said intensity map.

5. The method as recited in claim 4, wherein said intensity map further includes pixels defining a plurality of islands, further comprising removing pixels corresponding to said islands from said intensity map.

6. The method as recited in claim 5, wherein step (G) further comprises:

examining intensity levels radially outwardly from said center to detect said variations representing said boundary; and generating said epicardial image based on said epicardial boundaries.

7. The method as recited in claim 1, step (E) further comprising:

calculating a gradient map corresponding to said acquired image data, said gradient map having second pixels corresponding to a plurality of intensity gradient values;

removing said second pixels that are less than a predetermined threshold to produce third pixels defining said edge map; and subtracting said third pixels from said pixels corresponding to said intensity map.

8. The method as recited in claim 7, further comprising histogramming said gradient map to determine said predetermined threshold.

9. The method as recited in claim 1, wherein said organ is a human heart, and said outer boundary is a left ventricular epicardium of said heart.

10. The method as recited in claim 9, wherein said medical imaging system is a magnetic resonance imaging system.

11. The method as recited in claim 1, further comprising detecting a failure if said variations in intensity are insufficient to generate said image of said outer boundary.

12. The method as recited in claim 1, wherein said medical imaging system is an x-ray CT system.

13. A magnetic resonance imaging system for producing an image of an outer boundary of an organ, comprising:

means for acquiring NMR image data of said organ;

means for reconstructing an image corresponding generally to said organ using said acquired image data;

means for producing an intensity map having pixels lying within said organ, said means including:

i. means for dilating said acquired image data to produce a dilated image;

ii. means for generating a dilation boundary by subtracting said reconstructed image from said dilated image; and iii. means for generating said intensity map based, at least in-part, on intensity values corresponding to said dilation boundary;

means for refining said intensity map so as to include variations in intensity, wherein said variations define said outer boundary; and means for generating said image of said outer boundary based, at least in-part, on said variations;

means for iteratively moving said dilation boundary radially outwardly means for calculating a standard deviation of intensity values corresponding to the dilated boundary for each iteration; and means for determining that said dilation boundary has moved across said outer boundary based on a characteristic of said standard deviation.

14. The magnetic resonance imaging system as recited in claim 13, wherein said means for refining further comprises means for subtracting edge map image data from said intensity map.

15. The magnetic resonance imaging system as recited in claim 14, wherein said means for refining further comprises means for subtracting blood pool image data from said intensity map.

16. The magnetic resonance imaging system as recited in claim 15, wherein said means for refining further comprises means from subtracting island image data from said intensity map.

17. The magnetic resonance imaging system as recited in claim 16, wherein said organ is a human heart, and said outer boundary is a left ventricular epicardium of said heart.

18. The magnetic resonance imaging system as recited in claim 13, herein said means for generating comprise boundary detecting means for iteratively searching radially outwardly from a predetermined center of said organ to locate said variations corresponding to said boundary of said organ.

19. The magnetic resonance imaging system as recited in claim 13 further comprising failure detection means for indicating failure if said variations in intensity are insufficient to produce said image of said outer boundary.

20. A method for segmenting an image acquired with a medical imaging system to identify the boundary of an organ, comprising:

A. acquiring image data of said organ with said medical imaging system;

B. reconstructing an image corresponding generally to said organ using said acquired image data;

C. producing an intensity map having pixels lying within said boundary of said organ by segmenting the reconstructed image;

D. creating an edge map by detecting edges of said reconstructed image;

E. refining said intensity map by using information in said edge map so as to include variations in intensity corresponding to said boundary of said organ, including the steps of:
   i. calculating a gradient map corresponding to said acquired image data, said gradient map having second pixels corresponding to a plurality of intensity gradient values;
   ii. removing said second pixels that are less than a predetermined threshold to produce third pixels defining said edge map; and
   iii. subtracting said third pixels from said pixels corresponding to said intensity map.

21. The method as recited in claim 7, further comprising histogramming said gradient map to determine said predetermined threshold F. locating a center of said organ;

G. searching radially outwardly from said center to locate said variations in intensity; and H. generating an image of said outer boundary based, at least in-part, on said variations.

* * * * *

UNITED STATES PATENT AND TRADEMARK OFFICE
CERTIFICATE OF CORRECTION

PATENT NO. : 6,757,414 B1
DATED : June 26, 2004
INVENTOR(S) : Turek et al.

Page 1 of 1

It is certified that error appears in the above-identified patent and that said Letters Patent is hereby corrected as shown below:

Column 2,
Line 33, "$\overline{X}$" should be -- $\vec{X}$ --.

Line 34, "$(\overline{X})$" should be --$(\vec{X})$--.

Line 35, "$\overline{\nabla}/(\overline{X})$" should be -- $\vec{\nabla}/(\vec{X})$ --.

Column 3,
Line 6, "ransactions" should be -- transactions --.
Line 44, "pattem" should be -- pattern --.

Column 5,
Line 10, "percardial" should be -- epecardial --.

Column 16,
Line 44, "herein" should be -- wherein --.

Signed and Sealed this

Seventh Day of September, 2004

JON W. DUDAS
*Director of the United States Patent and Trademark Office*